United States Patent
Hagenlocher et al.

(10) Patent No.: US 9,590,480 B2
(45) Date of Patent: Mar. 7, 2017

(54) ELECTRIC MACHINE WITH DIFFERENT STATOR POLE SPACINGS

(75) Inventors: Roland Hagenlocher, Planegg (DE); Jens Steffen, Pürgen (DE); Anton Müller, Tutzing (DE); Peter Ehrhart, München (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 666 days.

(21) Appl. No.: 13/514,218

(22) PCT Filed: Nov. 29, 2010

(86) PCT No.: PCT/EP2010/068368
§ 371 (c)(1),
(2), (4) Date: Aug. 23, 2012

(87) PCT Pub. No.: WO2011/069849
PCT Pub. Date: Jun. 16, 2011

(65) Prior Publication Data
US 2012/0319526 A1    Dec. 20, 2012

(30) Foreign Application Priority Data
Dec. 8, 2009 (DE) .......................... 10 2009 057 446

(51) Int. Cl.
H02K 21/16    (2006.01)
H02K 1/14    (2006.01)

(52) U.S. Cl.
CPC ............. H02K 21/16 (2013.01); H02K 1/146 (2013.01); H02K 11/25 (2016.01); H02K 11/33 (2016.01)

(58) Field of Classification Search
CPC ............... H02K 1/146; H02K 11/0047; H02K 11/0073; H02K 21/16
(Continued)

(56) References Cited

U.S. PATENT DOCUMENTS 3,866,104 A * 2/1975 Heine ........................... 318/696
3,978,356 A * 8/1976 Spiesberger ........... H02K 29/03
310/156.42
(Continued)

FOREIGN PATENT DOCUMENTS

DE    2653387    6/1978
DE    102007059203    6/2009

OTHER PUBLICATIONS

International Search Report and Written Opinion from corresponding PCT Application No. PCT/EP2010/068368, dated Oct. 27, 2011, 12 pages.
(Continued)

Primary Examiner — John K Kim
(74) Attorney, Agent, or Firm — Brinks Gilson & Lione

(57) ABSTRACT

An electric machine comprises a rotor (200) equipped with permanent magnets (204, 206, 208, 210), and a stator (100) equipped with electromagnetic poles. The electric machine is characterized in that several adjacent electromagnetic poles respectively constitute an electromagnetic pole group in which the adjacent electromagnetic poles are spaced apart at a first electromagnetic pole spacing, that adjacent electromagnetic poles belonging to different electromagnetic pole groups are spaced apart at an electromagnetic pole spacing greater than said first electromagnetic pole spacing, that each electromagnetic pole group has an even number of electromagnetic poles, and that adjacent electromagnetic poles of an electromagnetic pole group are linked to each other so as to generate magnetic fields of opposite direction in operation.

11 Claims, 4 Drawing Sheets

(58) Field of Classification Search
USPC .......... 310/52, 54, 58, 68 C, 156.08, 156.12, 310/216.071
IPC ...................................................... H02K 1/16
See application file for complete search history.

(56) References Cited

U.S. PATENT DOCUMENTS

| | | | |
|---|---|---|---|
| 4,031,419 A * | 6/1977 | Spiesberger | H02K 37/14 310/156.42 |
| 4,700,098 A | 10/1987 | Kawashima | |
| 5,334,894 A * | 8/1994 | Nakagawa | H02K 37/12 310/112 |
| 6,384,496 B1 | 5/2002 | Pyntikov | |
| 6,791,226 B1 | 9/2004 | Dhawan | |
| 7,038,348 B2 * | 5/2006 | Takase | H02K 21/16 310/216.008 |
| 8,106,558 B2 * | 1/2012 | Yamamoto | H02K 21/222 310/179 |
| 8,922,087 B1 * | 12/2014 | Rittenhouse | H02K 1/148 310/112 |
| 2002/0047425 A1 | 4/2002 | Coupart | |
| 2004/0021395 A1 * | 2/2004 | Maslov et al. | 310/254 |
| 2012/0242184 A1 * | 9/2012 | Hu | 310/208 |
| 2012/0319526 A1 * | 12/2012 | Hagenlocher et al. | 310/216.071 |

OTHER PUBLICATIONS

International Preliminary Report on Patentability from the corresponding PCT Application No. PCT/EP2010/0686368, dated Apr. 25, 2012, 15 pages.

\* cited by examiner

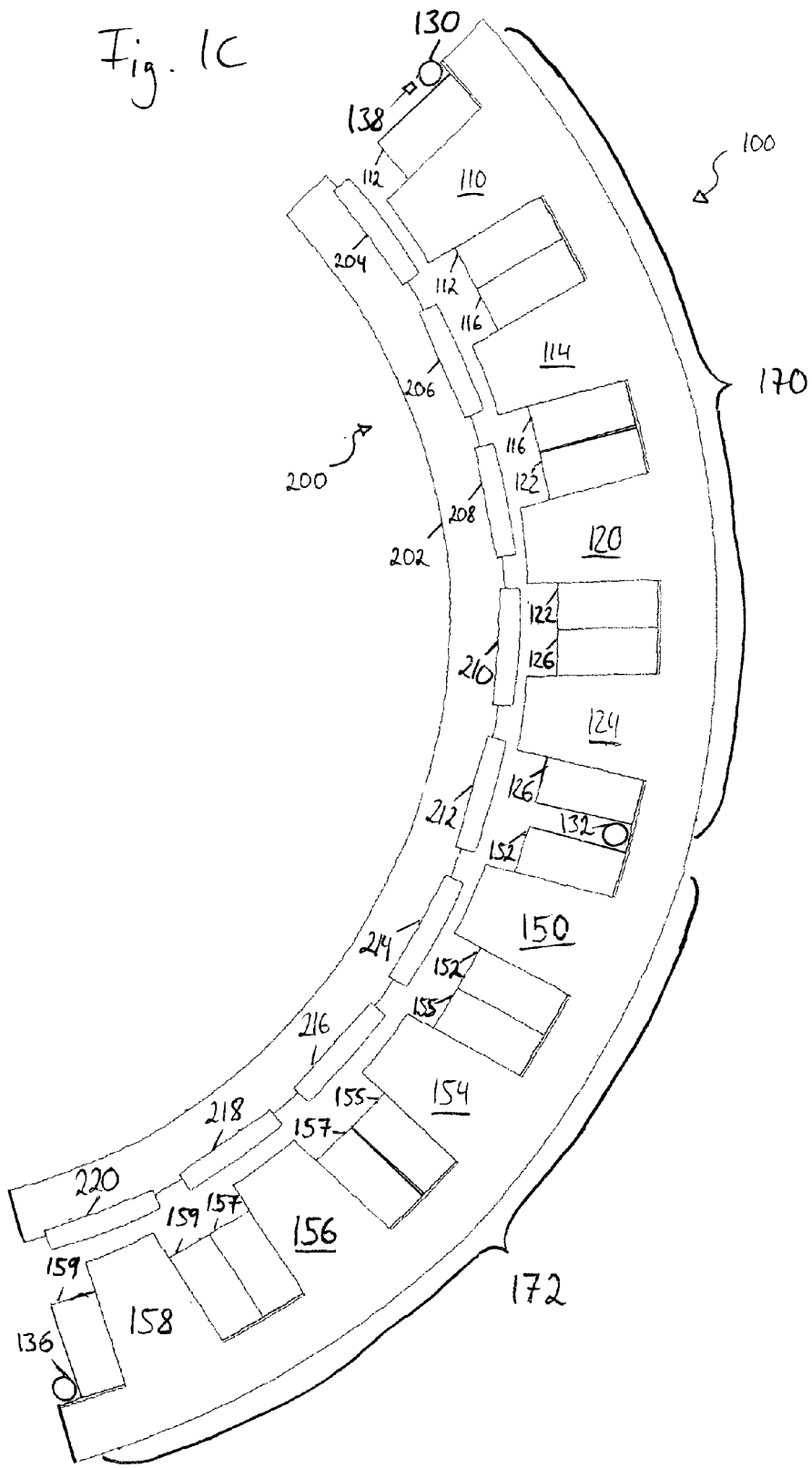

ELECTRIC MACHINE WITH DIFFERENT STATOR POLE SPACINGS

RELATED APPLICATIONS

This application claims the benefit under 35 U.S.C. §371 of International Patent Application No. PCT/EP2010/068368, having an international filing date of Nov. 29, 2010, which claims priority to German Patent Application No. 10 2009 057 446.8 filed Dec. 8, 2009. The contents of these applications are incorporated herein by reference in their entirety.

FIELD

The present invention relates to an electric machine comprising a rotor equipped with permanent magnets and a stator equipped with electromagnetic poles.

BACKGROUND

Such electric machines, having the permanent magnets uniformly distributed on the rotor and the electromagnetic poles uniformly distributed on the stator, have already been used as electric motors and generators for decades. In this regard, great expenditures have been taken for improving the performance and the efficiency of such machines. Nevertheless, there are considerable losses arising during operation of such machines. Such losses do not only affect the efficiency of the electric machine, but entail still other problems. In operation, in particular the rotor of conventional electric machines is subject to great heat, necessitating comprehensive cooling requirements for the machine in its entirety.

SUMMARY

Accordingly, the object underlying the present invention consists in making available an electric machine having reduced power losses in the rotor in comparison with the prior art described.

This object is met by an electric machine comprising the feature combination indicated in claim 1.

The electric machine comprises a rotor equipped with permanent magnets and a stator equipped with electromagnetic poles. The electric machine is characterized in that several adjacent electromagnetic poles respectively constitute an electromagnetic pole group in which the adjacent electromagnetic poles are spaced apart at a first electromagnetic pole spacing, that adjacent electromagnetic poles belonging to different electromagnetic pole groups are spaced apart at an electromagnetic pole spacing that is greater than said first electromagnetic pole spacing, that each electromagnetic pole group has an even number of electromagnetic poles, and that adjacent electromagnetic poles of an electromagnetic pole group are linked to each other so as to generate magnetic fields of opposite direction in operation.

Due to the groupwise arrangement and linking, in circuit terms, of an even number of electromagnetic poles, long-range magnetic flux in the electric machine, in particular through the rotor, is reduced drastically or avoided completely. A short, closed path is so to speak forced upon the magnetic flux in an electromagnetic pole group. A closed magnetic flux path normally leads from a first electromagnetic pole via an air gap between stator and rotor through permanent magnets of the rotor to the rotor yoke, from there through permanent magnets of the rotor, through the air gap to a second electromagnetic pole of the same electromagnetic pole group and through the stator core back to the original electromagnetic pole.

With the even distribution of the electromagnetic poles without groupwise linking in circuit terms, according to the prior art, there are often formed closed flux loops in which the flux lines extend over large distances in the rotor between two remote permanent magnets; accordingly, there are also present long-range effects in the stator, covering a multiplicity of electromagnetic poles. In contrast thereto, the present invention brings forth excellent prerequisites to the effect that the magnetic fields close within an electromagnetic pole group. The individual electromagnetic pole groups are spaced apart from the respective adjacent electromagnetic pole groups so that the coupling within one group is greater than the coupling between electromagnetic poles of different electromagnetic pole groups.

The claimed arrangement can thus prevent long-range magnetic flux through the rotor, which results in a reduction of the losses arising in connection with such magnetic fluxes. The reduction of the losses is accompanied by a reduction of the heat caused by losses. In addition to the reduction of the heat generated, the present invention provides the advantage that the space created between respective electromagnetic pole groups, which is not occupied by the coils of an electromagnetic pole, can be utilized for cooling. To this end, this space may be left free as an air gap in order to provide for air flow through this gap for cooling purposes. The intermediate space may also be used for accommodating cooling devices. As will be discussed in detail later on, the creation of this intermediate space between the electromagnetic pole groups affords the additional advantage of considerably facilitating both the manufacture of the individual components of the stator and the mounting of these components to a stator body.

In preferred embodiments, two adjacent electromagnetic poles respectively constitute an electromagnetic pole group. Alternatively, four adjacent electromagnetic poles respectively constitute an electromagnetic pole group. Such a comparatively small number of electromagnetic poles per electromagnetic pole group entails several advantages. A small number of electromagnetic poles per electromagnetic pole group results in a large number of electromagnetic pole groups. These in turn may be driven such that many partial phases are applied to the various electromagnetic pole groups, leading to very smooth running of a thus controlled electric motor and/or little generation of noise in operation of the electric machine. Moreover, the electromagnetic poles of comparatively small electromagnetic pole groups can be driven together easily. However, an electromagnetic pole group may also comprise 6 or 8 or still more electromagnetic poles.

In a preferred embodiment, the electric machine is characterized in that the respective electromagnetic pole spacing between adjacent electromagnetic poles belonging to different electromagnetic pole groups, as measured in the magnetic phase angle of the permanent magnets, is at maximum 40°, preferably at maximum 30°, greater than it would be with an equidistant distribution of the electromagnetic poles across the stator. The electromagnetic pole spacing in this regard is defined as the angle between the two centers of the given electromagnetic poles. In like manner, the permanent magnet spacing, also referred to as rotor pole spacing, is the angle between the two centers of the given permanent magnets, also referred to as rotor poles. The permanent magnets are uniformly distributed on the circumference and are, in radial direction, alternatingly polarized in opposite directions. There is formed a magnetic phase angle of 180° between the centers of juxtaposed permanent magnets. Accordingly, an increase of the electromagnetic pole spacing by 30°, as measured in the magnetic phase angle of the permanent magnets, corresponds to an increase by (30/180) *permanent magnet spacing. By way of this structure, an electric machine with the following properties can be made available. The amount of the voltage induced in the electromagnetic poles of an electromagnetic pole group does not deviate by more than 3% from the value of the induced voltage in case of an equidistant pitch of the stator, i.e. in case of uniform distribution of all stator electromagnetic poles around the stator circumference. Between the coils of different electromagnetic pole groups, there is a coupling ratio of at the most 0.2. Due to this, the electric machine is designed such that the performance is not significantly different from the performance of an electric machine with uniformly distributed stator electromagnetic poles, and such that there is little coupling between adjacent electromagnetic pole groups, so that the above-discussed short magnet flux loops result in conjunction with the linking within an electromagnetic pole group.

The afore-mentioned numerical value for the deviation of the electromagnetic pole spacing from an equidistant electromagnetic pole spacing about the stator circumference also has turned out advantageous in so far as, in comparison with the winding or iron volume lost, a sufficient width of the groove between the stator teeth of an electromagnetic pole group for accommodating the electromagnetic pole coils and a sufficient geometric additional width of the groove between adjacent electromagnetic pole groups are formed. The electromagnetic pole spacing between adjacent electromagnetic poles belonging to an electromagnetic pole group is adjusted in accordance with the selected spacing between adjacent electromagnetic pole groups. The electric machine is operated such that adjacent electromagnetic poles within a group have opposite magnetic fields at an arbitrary time of operation, so that the geometric spacing between two adjacent electromagnetic poles of an electromagnetic pole group corresponds to an electric/magnetic phase angle of approx. 180°.

It is also possible to design the electric machine such that the respective electromagnetic pole spacing between adjacent electromagnetic poles belonging to the same electromagnetic pole groups are set to lower values than the value that would be present in case of an equidistant distribution of the electromagnetic poles across the stator. This arrangement also permits the achievement of the afore-mentioned advantages as regards the reduced electromagnetic pole spacing within an electromagnetic pole group and the increased spacings between adjacent electromagnetic pole groups. It can be seen that the relationship between the increased electromagnetic pole spacing between two groups and the reduced electromagnetic pole spacing within the individual electromagnetic pole groups is dependent upon the number of electromagnetic poles per electromagnetic pole group. In preferred embodiments, the electromagnetic pole spacing between adjacent electromagnetic poles belonging to different electromagnetic pole groups is substantially greater than in case of an equidistant distribution of the electromagnetic poles across the stator, and in particular is by far greater than the differences in the electromagnetic pole spacings that are due to normal manufacturing tolerances.

It is particularly preferred for the electromagnetic pole spacing between adjacent electromagnetic poles belonging to different electromagnetic pole groups to be 240°, as measured in the magnetic phase angle of the permanent magnets. In other words, the electromagnetic pole spacing is 4/3 times the rotor pole spacing. This achieves especially effective decoupling between the two electromagnetic pole groups. In addition thereto, electromagnetic pole groups spaced apart in this manner can be directly associated with the phases of a 3-phase system.

In a preferred embodiment, adjacent electromagnetic poles belonging to different electromagnetic pole groups each have a second electromagnetic pole spacing. Such an arrangement, leading to a regular construction of the electric machine as regards the spacings of the respective electromagnetic pole groups, which may also be referred to as partially symmetric, presents a number of advantages. On the one hand, the stator may be composed entirely of identical stator components, with each component having exactly one or more electromagnetic pole group(s) and exactly one or more additional width(s) for the groove(s) between electromagnetic pole groups. On the other hand, adjacent electromagnetic pole groups have the same spacing across the entire stator circumference, so that a uniform construction is achieved as regards the utilization of the additional groove width between the electromagnetic pole groups, e.g. for cooling of the electric machine or for mounting the electric machine. Such a uniform construction may also be advantageous for the performance of the machine. In accordance with the driving scheme of the machine, the phasing of the various magnetic fields in relation to each other during operation and the requirements as to the residual ripple of the electric machine, however, it may also be advantageous not to arrange the electromagnetic pole groups with a constant spacing from each other. The term "residual ripple" of the electric machine is to be understood here as the non-constant course or behavior of the torque which the electric machine experiences in operation upon rotation of the rotor due to the geometric construction and the driving scheme.

In a further preferred embodiment, the permanent magnets have a rotor pole spacing, with the rotor pole spacing being different from the electromagnetic pole spacing, and being preferably smaller than the same. This embodiment is especially advantageous as regards the performance and the low residual ripple of the electric machine.

Adjacent electromagnetic poles of an electromagnetic pole group produce magnetic fields in opposite direction in operation. The magnetic field direction here relates to the radially extending part of the magnetic field through the air gap between stator and rotor. In other words: when a magnetic field is created from an electromagnetic pole in the stator to the rotor, the magnetic field extends from the rotor to the adjacent electromagnetic pole of the same electromagnetic pole group. Thus, in operation there is formed a closed magnetic flux loop through two adjacent electromagnetic poles of an electromagnetic pole group. Due to the fact that each electromagnetic pole group has an even number of electromagnetic poles, there are thus formed only short-range magnetic loop within an electromagnetic pole group. This minimizes the losses arising in the rotor, which in turn leads to the advantages discussed hereinbefore.

The linking of adjacent electromagnetic poles of an electromagnetic pole group according to the invention, such that these generate magnetic fields of opposite direction in operation, can be achieved in a large variety of ways. On the one hand, a connection of adjacent electromagnetic poles can be established on a wiring level. Adjacent electromagnetic poles may be connected in series so that magnetic fields of opposite direction are formed in the adjacent electromagnetic poles. To this end, the wiring is devised such that the current, as seen in radial direction, flows through two adjacent coils of two adjacent electromagnetic poles in opposite directions, i.e. in one coil in clockwise direction and in the other coil in anticlockwise direction. In an electromagnetic pole group consisting of two electromagnetic poles, the two electromagnetic poles may be connected in series; in an electromagnetic pole group consisting of four electromagnetic poles, all four electromagnetic poles may be connected in series. On the other hand, the electromagnetic poles may be controlled electronically. In this case, the adjacent electromagnetic poles may be connected to different terminals fed by an (or more, respectively) control electronics. The electronics system provides for a corresponding driving scheme of the electromagnetic poles for generating corresponding magnetic fields of opposite direction. There are also solutions conceivable in which sub-groups of the electromagnetic poles are connected in series, whereas different sub-groups are controlled through different electronics terminals.

In accordance with a preferred embodiment of the invention, each of the electromagnetic poles comprises a stator tooth and a coil surrounding the stator tooth, with winding grooves respectively being provided between two stator teeth, for accommodating the coils. Thus, in assembling the electric machine, the coils conveniently may be placed onto the stator teeth. For this purpose, rigid, not loosely wound coils are especially—but not exclusively—suitable. The shape of the grooves within an electromagnetic pole group preferably is rectangular. Rectangular in this regard is to be understood that the grooves in cross-section form recesses having substantially right angles. Consequently, the stator teeth in a preferred embodiment are formed with tapering lateral edges, i.e. they are trapezoidal in cross-section. It can be seen that the sliding insertion of the coils onto the stator teeth according to the present embodiment is particularly convenient in the mounting operation. It is of course also possible to wind the coil windings directly onto the stator teeth. The grooves between different electromagnetic pole groups may be of rectangular cross-section as well, but preferably are not of rectangular cross-section. These inter-group grooves in particular may make use of any shape providing space for the coils extending around the adjoining stator teeth and making optimum use of the remaining space for desired additional functions.

In a preferred embodiment, a temperature sensor and/or cooling means is/are provided between adjacent electromagnetic poles belonging to different electromagnetic pole groups. In this manner, the free space present between different electromagnetic pole groups is utilized for temperature monitoring of the electric machine and/or for cooling the same. Together with the reduction of the rotor losses and thus the reduced heating of the rotor as a result of the even number of electromagnetic poles per electromagnetic pole group, the active cooling of the electric machine affords additional advantages. The electric machine may be operated in the maximum performance mode, subjecting the machine to maximum heating, over a longer period of time. The requirements as to cooling times and, respectively, operational times involving less heating are reduced. In addition thereto, the electric machine in its entirety may be of more compact design or may be arranged in a smaller housing since the requirements for cooling means outside the stator/rotor assembly are lower. The arrangement of a temperature sensor in the free space between two electromagnetic pole groups entails the additional advantage that temperature detection takes place in immediate proximity to the rotor, requiring no complicated mounting of the sensor and no complicated, e.g. wireless, transmission of the temperature signal to the control of the electric machine.

In a further embodiment, there are provided, between adjacent electromagnetic poles belonging to different electromagnetic pole groups, mounting means for mounting electromagnetic poles to a stator body. In this manner, the free space present between adjacent electromagnetic pole groups is utilized for simplifying and/or improving the assembly operation of the electric machine. The mounting means may consist e.g. of a suitable design of an intermediate piece, so that one electromagnetic pole group is clamped between two such intermediate pieces and is thus held in place. These intermediate pieces may be connected to the stator body by means of screws, bolts etc. so that the electromagnetic poles are fixed in position with respect to the stator body. Such fixing can be effected expediently, inexpensively and rapidly during the assembly operation. In addition, it can be released just as expediently, inexpensively and rapidly for maintenance and repair work. An exemplary embodiment for such intermediate pieces are grooved strips extending axially along the electric machine between two electromagnetic pole groups each.

In a still further preferred embodiment, the stator has a stator core that is interrupted between adjacent electromagnetic poles belonging to different electromagnetic pole groups. By way of this arrangement, magnetic loops in the stator core extending over several electromagnetic pole groups are avoided. The generation of short-range closed magnetic fields in two adjacent electromagnetic poles is enhanced even further. The decoupling of the various electromagnetic pole groups is enhanced even more with this constructional measure, whereby the above-discussed advantages concerning short magnetic flux loops present themselves even more strongly. The interruption may be provided in the form of any suitable, non-magnetic material. This provides for a magnetic isolation between the electromagnetic pole groups.

The interruption of the stator core may be designed as a mounting means for mounting electromagnetic poles to a stator body. The interruption thus serves both for the purpose of an improved construction with respect to the assembling and disassembling properties of the electric machine and for decoupling the individual electromagnetic pole groups. As an alternative, the interruption can be designed as a receiving means for a cooling means and/or a temperature sensor. The interruption even may be designed so as to simultaneously serve as a mounting means and as a receiving means for a cooling means and/or a temperature sensor.

In a particularly preferred embodiment, a stator segment prefabricated as a complete unit comprises the electromagnetic poles of an electromagnetic pole group. Such a complete unit can be prefabricated easily. Moreover, rapid and inexpensive assembly of the stator from such prefabricated stator segments is ensured, with these segments in the assembly operation being merely fixed to a stator body and connected to the control unit of the electric machine.

In accordance with a preferred embodiment, the electric machine comprises furthermore first control electronics and second control electronics, wherein one electromagnetic pole group of a respective set of two adjacent electromagnetic pole groups is connected to the first control electronics, with the respectively other electromagnetic pole group being connected to the second control electronics. It is possible in this manner to operate the electric machine with only two control electronics, thus contributing to low-complexity and inexpensive production of the electric machine.

As an alternative, a respective set of two adjacent electromagnetic pole groups can be connected to the same control electronics. In particular, the driving scheme can be designed such that two adjacent electromagnetic pole groups are connected to first control electronics, the next two electromagnetic pole groups are connected to second control electronics, the following next two electromagnetic pole groups are connected to the first control electronics again, etc.

The features indicated in the original dependent claims on the one hand are optional preferential features indicating, in conjunction at least with the features of original claim 1, preferred embodiments of the invention. However, it is expressly emphasized that a large part of these features results in technically sensible and advantageous electric machines also without the features of original claim 1 being realized at the same time. It is thus expressly disclosed that claiming the features of the original dependent claims as such, i.e. without inclusion of the features of original claim 1, constitutes independent inventions; it is also possible in this regard to include a partial number of the features of original claim 1.

DRAWINGS

The invention will be explained in more detail hereinafter by way of embodiments illustrated in the drawings in which FIG. 1A is a fragmentary cross-sectional view of a first embodiment of an electric machine according to the invention;

DETAILED DESCRIPTION

Figure 1A:
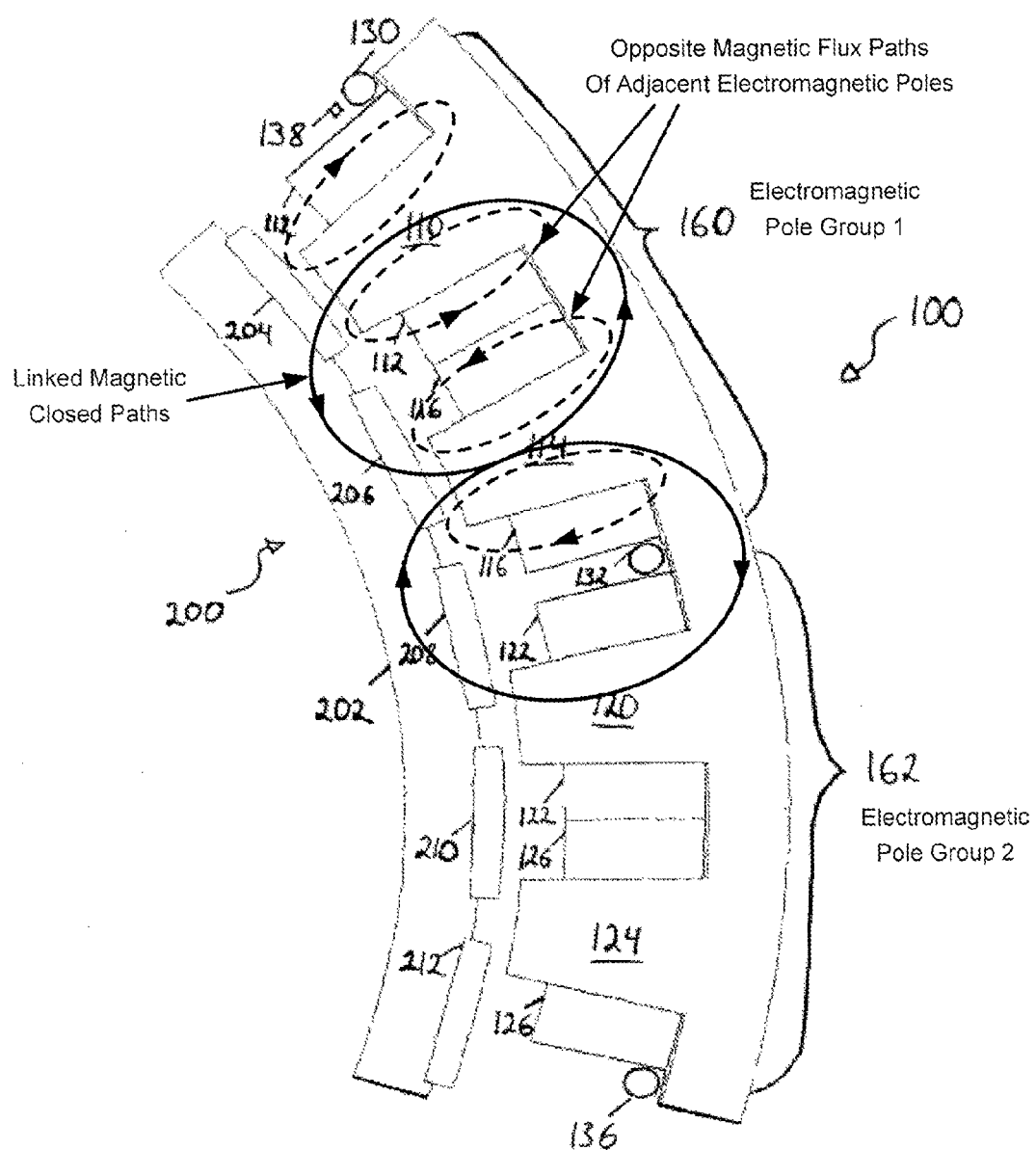
FIG. 1B is a view similar to FIG. 1A, showing a rotor pole spacing, a spacing between adjacent electromagnetic poles within the same electromagnetic pole group and a spacing between adjacent electromagnetic poles at the electromagnetic pole group boundary.
FIG. 1C is a fragmentary cross-sectional view of a variation of the electric machine of FIG. 1A.

FIG. 1A shows a fragmentary cross-sectional view of an electric machine according to an embodiment of the present invention. The part illustrated shows a sector of each of the stator 100 and the rotor 200. The part illustrated covers approx. ⅙ of the overall circumference of the electric machine.

Stator 100 has a stator core 102. The stator core 102 comprises an annular portion having four stator teeth 110, 114, 120 and 124 extending inwardly therefrom. The stator teeth 110, 114, 120 and 124 are of trapezoidal cross-section and are spaced apart from each other. The stator teeth are surrounded by respective magnetic coils. Stator tooth 110 constitutes a first electromagnetic pole together with magnetic coil 112, stator tooth 114 constitutes a second electromagnetic pole together with magnetic coil 116, stator tooth 120 constitutes a third electromagnetic pole together with magnetic coil 122, and stator tooth 124 constitutes a fourth electromagnetic pole together with magnetic coil 126. In the exemplary embodiment of FIG. 1A, the stator teeth are formed of iron sheets and are the iron cores of the respective magnetic coils surrounding the same. The stator core 102 and the stator teeth 110, 114, 120 and 124 are of integral design. However, they may also be composed of several component parts.

Between the stator teeth, there are provided rectangular recesses. As seen from radially inside towards the outside, these recesses constitute rectangular grooves between the stator teeth. The magnetic coils 112, 116, 122 and 126 also are of rectangular shape in cross-section, with the magnetic coils being of identical cross-section. The first and second electromagnetic poles together constitute a first electromagnetic pole group 160. The third electromagnetic pole and the fourth electromagnetic pole constitute a second electromagnetic pole group 162 adjacent said first electromagnetic pole group 160. The groove between stator tooth 110 and stator tooth 114, i.e. the groove located within an electromagnetic pole group, is narrower than the groove between stator tooth 114 and stator tooth 120, i.e. the groove located between two electromagnetic pole groups. The groove between stator tooth 110 and stator tooth 114 is exactly of such a width that the sections of the magnetic coils 112 and 116 coming to lie in the groove in essence fill the groove width completely.

Due to the fact that the cross-sectional areas of the magnetic coils are alike, it follows that an air gap is left free between magnetic coil 116 and magnetic coil 122 in the groove between stator tooth 114 and stator tooth 120. In the exemplary embodiment of FIG. 1A, a cooling duct 132 is arranged in this air gap. On the opposite side of the first electromagnetic pole group 160, beside magnetic coil 112, there is arranged an additional cooling duct 130. On the opposite side of the second electromagnetic pole group 162, there is arranged an additional cooling duct 136. The cooling ducts 130, 132 and 136 are each disposed on the groove bottom, i.e. in immediate proximity to the stator core 102. It is also conceivable to shift these cooling ducts in radial direction to a different place in the air gap between the magnetic coils. The cooling ducts are of round cross-sectional area, and the diameter of the cooling ducts substantially corresponds to the air gap between the magnetic coils. It is also possible to use other cross-sectional areas and dimensions. In addition, a temperature sensor 138 is provided adjacent to cooling duct 130.

Figure 1B:
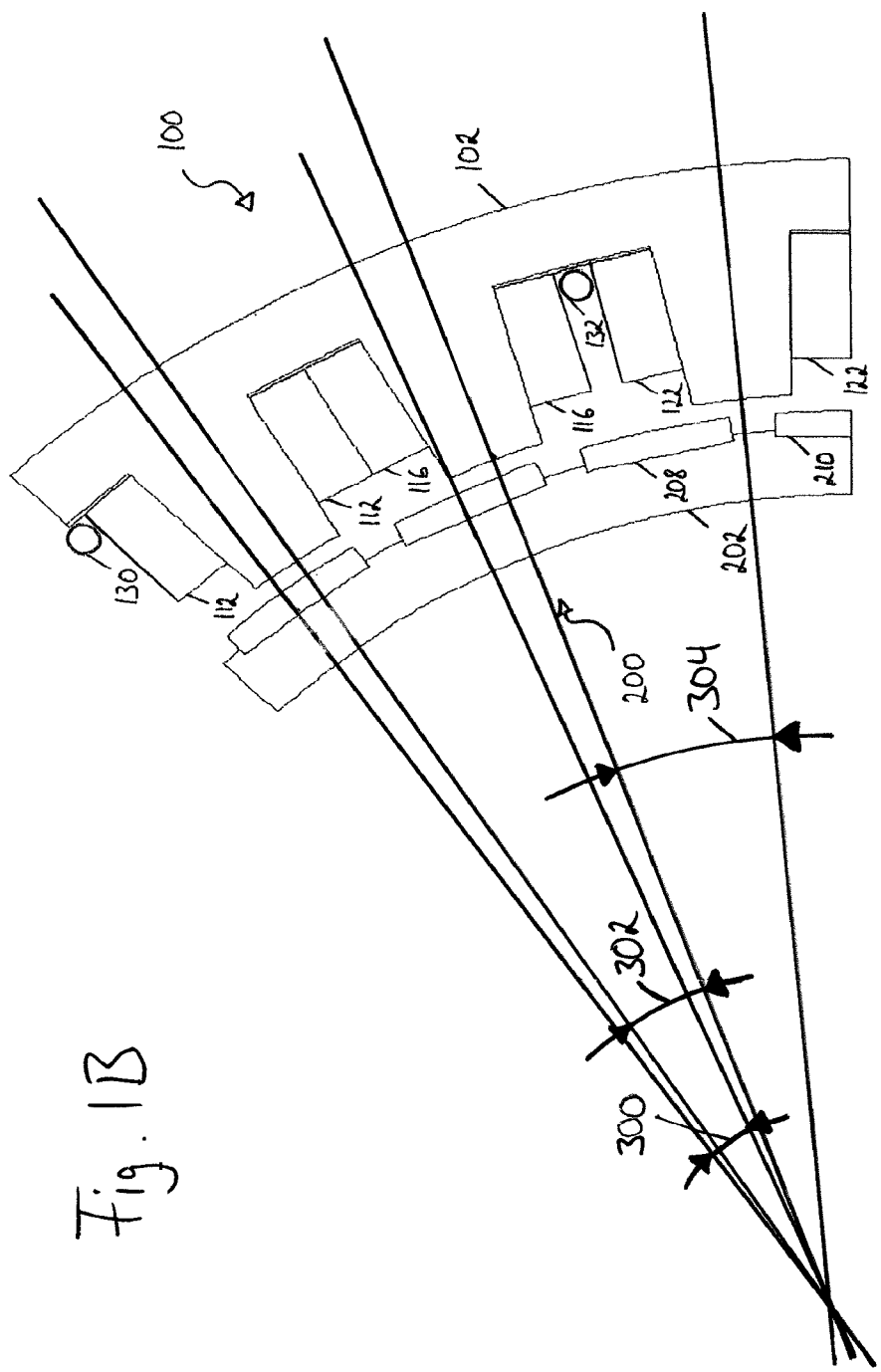

The illustrated section of rotor 200 shows an annular rotor core 202 having a plurality of permanent magnets attached thereto. The illustrated section shows five permanent magnets 204, 206, 208, 210 and 212. The spacing between adjacent permanent magnets is the same. The individual permanent magnets are also referred to as rotor poles in the present description, and the distance between the same as rotor pole spacing. The rotor pole spacing is illustrated with reference numeral 300 in FIG. 1B, which shows the stator 100 and rotor 200 of FIG. 1A together with the respective spacing indications. The permanent magnets are magnetized such that, for each one, one of the north and south poles is located on the side facing the stator and that, accordingly, the other one of their north and south poles is located on the side mounted on the rotor core. The permanent magnets are arranged such that their polarities alternate.

In the embodiment of FIG. 1A, the rotor pole spacing is smaller than the spacing between adjacent electromagnetic poles, both within an electromagnetic pole group and also at the electromagnetic pole group boundaries. The spacing between adjacent electromagnetic poles within an electromagnetic pole group is indicated with reference numeral 302 in FIG. 1B. The spacing between adjacent electromagnetic poles at the electromagnetic pole group boundary is indicated with reference numeral 304 in FIG. 1B. Due to this configuration, at least some of the relative positions of the individual permanent magnets, in relation to the respective opposite electromagnetic poles, are different at an arbitrary time of operation. At the moment of time illustrated in FIG.

1A, permanent magnet 204 comes to lie exactly opposite stator tooth 110 and the section of magnetic coil 112 on one side of stator tooth 110. The permanent magnets 206, 208 and 210, at the moment of time illustrated, have different relative positions each in relation to the respective opposite electromagnetic pole.

The respective torques resulting between opposite poles add up during operation such that the torque produced upon rotation of the rotor is as high as possible and as constant as possible. As is apparent to the person skilled in the art in this regard, the driving scheme of the magnetic coils with multi-phase control signals is of decisive relevance here. As the skilled person in the field of electric machines is capable of indicating a suitable control, a detailed discussion of this aspect is dispensed with here.

Rotor core 202, in the embodiment of FIG. 1A, is shown to be annular. This annular rotor core 202, for operation of the electric machine, may be arranged on an axle to which/from which the movement of the rotor core 202 is transferred. The axle and the rotor core 202 may both be made of ferromagnetic materials. Axle and rotor core 202 may also be of integral design.

Operation of the electric machine, of which a part is shown in FIG. 1A in a cross-sectional view, will be explained hereinafter. It is presumed first that the electric machine of FIG. 1A is operated as an electric motor. Secondly, it is presumed that the rotor rotates in clockwise direction in the view illustrated. Thirdly, it is presumed that, at the moment of time illustrated, the magnetic fields electrically generated in the stator teeth 110 and 114 of the electromagnetic poles in radial direction are of opposite polarity to the respective permanent magnets 204 and 206 located largely opposite the same. The interaction of the magnetic fields of the permanent magnets and the electrically generated magnetic fields thus results in a closed magnetic flux loop through stator tooth 110, through the air gap to the "upper surface" of permanent magnet 204, from the "lower surface" of permanent magnet 204 to the "lower surface" of permanent magnet 206—which are of opposite polarity —, through the air gap to stator tooth 114 and through the annular portion of stator body 102 to stator tooth 110. It can be seen in this regard that, due to the relative position of the permanent magnets to the electromagnetic poles, there is arising a force acting on the rotor in clockwise direction. It can be seen in addition that, with further rotation of the rotor and polarity reversal of the electromagnetic poles at a later moment of time—permanent magnet 204 at said later time is located in the position of permanent magnet 206 at the moment illustrated, a further permanent magnet (not shown) at said later moment of time is located in the position of permanent magnet 204 at the moment illustrated—, there is again formed a magnetic flux loop that is directed oppositely to the one described above, but again exerts a force on the rotor in clockwise direction. In this manner, there is achieved a continuous operation of the electric motor, establishing short-range magnetic flux paths.

Magnetic coil 116 is connected in series with magnetic coil 112 such that magnetic fields of opposite direction are created in the magnetic cores of the same, i.e. in stator teeth 110 and 114. In particular, time-variable magnetic fields are electrically generated in the stator teeth 110 and 114, having phases that are displaced from each other by 180° or, in other words, have the same amount, but are of opposite polarity.

The afore-mentioned short-range magnetic flux paths can be achieved across the entire electric machine by way of a corresponding driving scheme of the magnetic coils of the electromagnetic poles of the stator. This is due to the decoupling of the different electromagnetic pole groups as well as the provision of an even number of electromagnetic poles within an electromagnetic pole group, through which long-range magnetic flux paths are avoided. As discussed hereinbefore, short-range magnetic flux paths considerably reduce the losses arising in the electric machine, so that the development of heat in the electric machine is reduced as well.

The heat development is efficiently counteracted in addition by the provision of the cooling ducts 130, 132 and 136. The cooling ducts have a fluid, preferably a cooling liquid, flowing through the same, taking up the heat created in the electric machine through the duct wall and transporting the same away. It is also possible that a plurality of cooling ducts extend in parallel between the magnetic coils. The illustrated cooling ducts 130, 132 and 136 effect both transport of the waste heat generated in the magnetic coils by the current and transport of the waste heat produced by the varying magnetic fields in rotor core 202 and stator core 102. It is particularly efficient to insert the cooling ducts between the magnetic coils, as a particular hot spot of the electric machines described may be present at this location.

FIG. 1C shows a variation of the electric machine of FIG. 1A. The rotor 200 of FIG. 1C corresponds to the rotor 200 of FIG. 1A. Nine permanent magnets 204, 206, 208, 210, 212, 214, 216, 218 and 220 of the rotor 200 are shown in FIG. 1C. The stator 100 of FIG. 1C differs from the stator of FIG. 1A in that four electromagnetic poles form an electromagnetic pole group. In particular, the stator tooth 110 and the magnetic coil 112, the stator tooth 114 and the magnetic coil 116, the stator tooth 120 and the magnetic coil 122, and the stator tooth 124 and the magnetic coil 126 constitute four electromagnetic poles that jointly form a first electromagnetic pole group 170. The stator tooth 150 and the magnetic coil 152, the stator tooth 154 and the magnetic coil 155, the stator tooth 156 and the magnetic coil 157, and the stator tooth 158 and the magnetic coil 159, constitute four electromagnetic poles that jointly form a second electromagnetic pole group 172.

Figure 2:
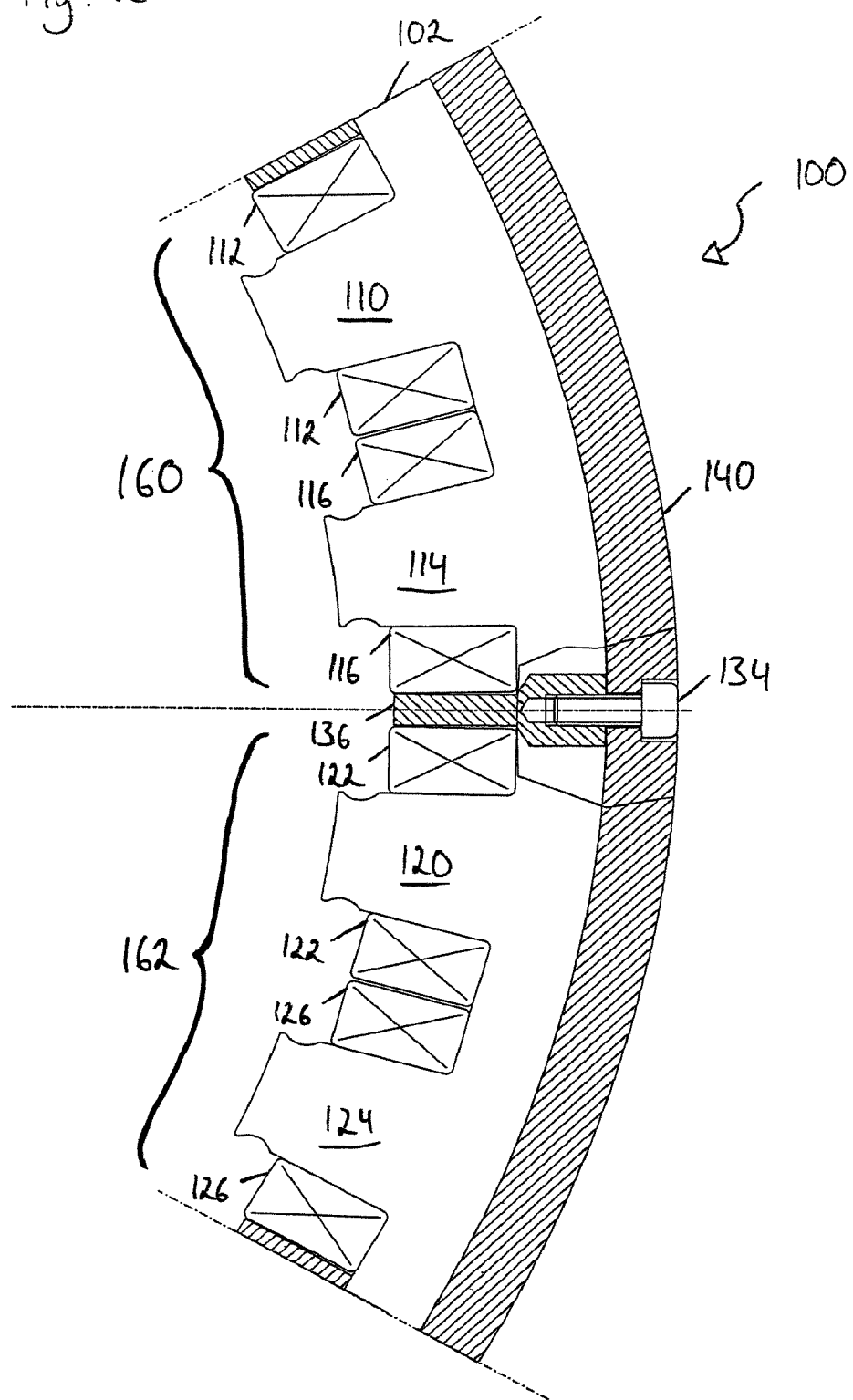
FIG. 2 shows a fragmentary cross-sectional view of a second embodiment of an electric machine according to the invention.

FIG. 2 shows a fragmentary cross-sectional view of an electric machine according to a second embodiment of the present invention. Components corresponding to components of the embodiment of FIG. 1A are designated with the same reference numerals. For reasons of better visibility, there is no rotor part shown in FIG. 2. It is presumed that the rotor has the design described in connection with FIG. 1A. FIG. 2 shows a somewhat larger sector of the stator, namely approx. ⅙ of the total stator. Due to the fact that the electromagnetic poles of the embodiment according to FIG. 2 are of identical design as the electromagnetic poles of the embodiment according to FIG. 1A, FIG. 2 reveals a larger number of electromagnetic poles, to be precise four electromagnetic poles. As regards the second electromagnetic pole group 162, there is not only shown one electromagnetic pole, consisting of stator tooth 120 and magnetic coil 122 (as in case of FIG. 1A), but also the second electromagnetic pole, consisting stator tooth 124 and magnetic coil 126. Thus, in total two electromagnetic pole groups 160, 162 having two electromagnetic poles each are shown. As in case of FIG. 1A, a wider groove is provided between the adjacent stator teeth 114 and 120 belonging to different electromagnetic pole groups than between the adjacent stator teeth 110 and 114 as well as 120 and 124, respectively, belonging to the same electromagnetic pole groups. The advantages described with reference to FIG. 1A thus can be read directly on the embodiment of FIG. 2. The operation of the embodiment of FIG. 2 is comparable to the operation of the embodiment of FIG. 1A.

The stator core 102 of the embodiment according to FIG. 2 is interrupted at the electromagnetic pole group boundary by an intermediate piece 136. In addition thereto, the stator core 102 and the intermediate piece or interruption 136 are confined radially outside by a stator body 140. In other words, stator core 102 and intermediate piece 136 are mounted on an annular stator body 140. In the exemplary embodiment of FIG. 2, such mounting is effected by means of a screw 134. By way of screw 134, intermediate piece 136 is fixed to stator body 140. At the respective other ends of the electromagnetic pole groups illustrated, there are provided similar screws and similar intermediate pieces (not shown). Due to the fixation of the intermediate pieces, the electromagnetic pole groups are clamped between the intermediate pieces, as is apparent from simple geometric considerations concerning circle segments. Accordingly, the components of the stator may be fixed by simply threadedly attaching intermediate pieces between the electromagnetic pole groups. This ensures simple, rapid and inexpensive mounting and unmounting possibilities of the stator. As an alternative/in addition to the fixation described, the individual electromagnetic pole groups may also be attached to the stator body 40 in a different suitable manner. The intermediate pieces may be provided in the form of axially extending grooved strips or rods or bars.

FIG. 2 shows stator body 140 and intermediate piece 136 in hatched manner. This is to illustrate that these components are of non-magnetic design. This means that they consist, in the exemplary embodiment of FIG. 2, of a material that does not support the propagation of magnetic flux, i.e. of a non-ferromagnetic material. The two electromagnetic pole groups 160, 162 illustrated thus are magnetically separated from each other. In this manner, long-range magnetic flux paths, i.e. magnetic flux paths extending across several electromagnetic pole groups, are further reduced in operation of the electric machine. The formation of short magnetic loops across the stator teeth of one electromagnetic pole group and a short flux path in the rotor is enhanced, resulting in the advantages discussed hereinbefore.

However, it is also possible that the intermediate pieces do not interrupt the iron core of the stator and provide for mechanical separation only, bringing about the afore-mentioned advantages for the assembly operation.

For fixing the intermediate pieces that may be in the form of grooved strips extending in axial direction, bolts may be used as an alternative to screws. Bolts or screws may be arranged for example in a periodical, axially spaced manner. Also, elongate, axially extending connecting elements may be utilized. Cooling devices and/or temperature sensors may be accommodated in the intermediate pieces.

It is expressly emphasized that the roles of stator and rotor my be exchanged in all embodiments. The stator thus may have permanent magnets, and the rotor may have electromagnetic poles. Instead of permanent magnets, there may also be provided a second set of electromagnetic poles. As seen in radial direction, the stator may be arranged both outside and inside, with the immediate effect that the rotor may be arranged both outside and inside as well. A rotor/stator combination according to the invention may be operated both as electric motor and as generator. A linear motor, in which a first motor element provided with a plurality of magnetic elements moves linearly in relation to a second motor element provided with a plurality of magnetic elements as well, can be designed in accordance with the principles of the present invention as well. Such embodiments are considered to be equivalent solutions to the problem indicated hereinbefore.

Driving of an electric motor according to the invention or extracting the energy being generated in a generator according to the invention typically is effected in multi-phase manner. The electromagnetic pole groups of an electric motor according to the invention may be driven with three different phases. To this end, three-phase current may be used. As an alternative, driving may be effected by means of pulse width modulated signals. A number of phases different from three is also conceivable.

In a preferred embodiment, the electric machine comprises twelve electromagnetic pole groups. The electromagnetic pole groups are driven in succession with one of three phases in alternating manner. Moreover, two adjacent electromagnetic pole groups are driven by the same control electronics, respectively, with only two control electronics being provided in total. The first control electronics accordingly drive two adjacent electromagnetic pole groups, the second control electronics drive the next two electromagnetic pole groups, the first control electronics again drive the subsequent two electromagnetic pole groups, etc.

In addition thereto, it is to be pointed out that the permanent magnets do not have to be of rectangular cross-section. In particular a cross-section in the form of a loaf of bread is conceivable that is curved towards the air gap, preferably with a relatively large radius of curvature.

As regards the conditions of the pole pitches at the rotor, at the stator within an electromagnetic pole group and at the stator between two electromagnetic pole groups with respect to each other, there are many options conceivable. With reference to FIG. 1A, the possibility has been described according to which the rotor pole pitch is smaller than the stator pole pitch within an electromagnetic pole group. These two pole pitches, i.e. the angles between the respective pole centers, may also be equal. The pole pitch between two electromagnetic pole groups, of course, is larger than the two afore-mentioned pole pitch measures. The pole pitch within an electromagnetic pole group, however, may also lie between the theoretically equidistant stator pole pitch and the rotor pole pitch. In this context, the relative number of the rotor poles and stator poles comes to bear, with preferred embodiments of the electric machine being provided with more rotor poles than stator poles, e.g. two more.

The invention claimed is:

1. An electric machine, comprising
   a rotor equipped with permanent magnets, and
   a stator equipped with electromagnetic poles;
   characterized in
   that the electromagnetic poles of the stator form a plurality of electromagnetic pole groups and that all adjacent electromagnetic poles within the plurality of electromagnetic pole groups are spaced apart at a first electromagnetic pole spacing, respectively,
   that adjacent electromagnetic poles belonging to different ones of the plurality of electromagnetic pole groups are spaced apart at a second electromagnetic pole spacing greater than said first electromagnetic pole spacing,
   that each of the plurality of electromagnetic pole groups consists of an even number of electromagnetic poles,
   that adjacent electromagnetic poles of an electromagnetic pole group are magnetically coupled and linked to each other so as to generate magnetic fields of opposite direction in operation,
   that all adjacent permanent magnets have a rotor pole spacing, respectively, and that the rotor pole spacing is different from the first electromagnetic pole spacing, when measured in geometric angles, wherein the rotor pole spacing, the first electromagnetic pole spacing and the second electromagnetic pole spacing are defined as angles between centers of the permanent magnets and the electromagnetic poles, respectively, wherein the permanent magnets are alternatingly polarized in opposite directions and the rotor pole spacing between centers of adjacent permanent magnets corresponds to a magnetic phase angle of 180°, and that the second electromagnetic pole spacing between adjacent electromagnetic poles belonging to different ones of the plurality of electromagnetic pole groups, as measured in the magnetic phase angle of the permanent magnets, is 240°.

2. The electric machine according to claim 1, wherein two adjacent electromagnetic poles respectively constitute an electromagnetic pole group.

3. The electric machine according to claim 1, wherein four adjacent electromagnetic poles respectively constitute an electromagnetic pole group.

4. The electric machine according to claim 1, characterized in that the respective electromagnetic pole spacing between adjacent electromagnetic poles belonging to different ones of the plurality of electromagnetic pole groups, as measured in the magnetic phase angle of the permanent magnets, is at maximum 40°, preferably at maximum 30°, greater than it would be with an equidistant distribution of the electromagnetic poles across the stator.

5. The electric machine according to claim 1, wherein the rotor pole spacing is smaller than the first electromagnetic pole spacing, when measured in geometric angles.

6. The electric machine according to claim 1, wherein each of the electromagnetic poles comprises a stator tooth and a coil surrounding the stator tooth, with winding grooves respectively being provided between two stator teeth for accommodating the coils.

7. The electric machine according to claim 1, wherein at least one of a temperature sensor and cooling means is provided between adjacent electromagnetic poles belonging to different electromagnetic pole groups.

8. The electric machine according to claim 1, wherein mounting means (134, 136) for mounting electromagnetic poles to a stator body (140) are provided between adjacent electromagnetic poles belonging to different electromagnetic pole groups.

9. The electric machine according to claim 1, wherein the stator comprises a stator core that is interrupted between adjacent electromagnetic poles belonging to different ones of the plurality of electromagnetic pole groups.

10. The electric machine according to claim 9, wherein the interruption of the stator core is designed as a mounting means (134, 136) for mounting electromagnetic poles to a stator body (140).

11. The electric machine according to claim 1, wherein a stator segment prefabricated as a complete unit comprises the electromagnetic poles of one electromagnetic pole group.

* * * * *